(12) United States Patent
Yamamoto

(10) Patent No.: US 10,802,461 B2
(45) Date of Patent: Oct. 13, 2020

(54) CONTROLLER FOR MACHINE TOOL

(71) Applicant: FANUC CORPORATION, Yamanashi (JP)

(72) Inventor: Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/377,670

(22) Filed: Apr. 8, 2019

(65) Prior Publication Data
US 2019/0310601 A1 Oct. 10, 2019

(30) Foreign Application Priority Data
Apr. 9, 2018 (JP) .................................. 2018-074955

(51) Int. Cl.
*G05B 19/18* (2006.01)

(52) U.S. Cl.
CPC .. *G05B 19/182* (2013.01); *G05B 2219/36204* (2013.01); *G05B 2219/45215* (2013.01)

(58) Field of Classification Search
CPC ........ G05B 19/182; G05B 2219/45215; G05B 2219/36204; G05B 2219/49047; G05B 2219/49055; G05B 19/19; G05B 19/186; G05B 2219/45136; G05B 2219/45203
See application file for complete search history.

(56) References Cited

U.S. PATENT DOCUMENTS

| 5,143,493 A | * | 9/1992 | Najima | B23B 47/34 409/141 |
| 2008/0141836 A1 | * | 6/2008 | Eba | G05B 19/184 82/18 |
| 2009/0107308 A1 | * | 4/2009 | Woody | B23B 1/00 82/1.11 |
| 2010/0296889 A1 | * | 11/2010 | Lundblad | B23Q 11/0039 409/131 |
| 2016/0221135 A1 | * | 8/2016 | Tiefenbock | B23B 51/00 |
| 2020/0117162 A1 | * | 4/2020 | Koyama | G05B 19/182 |

FOREIGN PATENT DOCUMENTS

| JP | 5851670 B1 | 2/2016 |
| WO | 2016/056526 A1 | 4/2016 |

* cited by examiner

*Primary Examiner* — Ziaul Karim
(74) *Attorney, Agent, or Firm* — Studebaker & Brackett PC

(57) ABSTRACT

A controller for a machine tool is configured to shred chips in thread cutting. The controller includes a processor that calculates an oscillation amplitude and an oscillation direction for shredding the chips from lathe-turning machining. The chip shredding is based on an infeed amount in a radial direction of a work and a shift amount in a circumferential direction of the work relative to a last machining path of a tool used for the lathe-turning machining on the work. The processor also calculates an oscillation command for causing the work and the tool to oscillate relative to each other based on the calculated oscillation amplitude and the oscillation direction. The processor then adds a movement command for moving the work and the tool relative to each other for the machining and the oscillation command.

3 Claims, 11 Drawing Sheets

CONTROLLER FOR MACHINE TOOL

This application is based on and claims the benefit of priority from Japanese Patent Application No. 2018-074955, filed on 9 Apr. 2018, the content of which is incorporated herein by reference.

BACKGROUND OF THE INVENTION

Field of the Invention

The present invention relates to a controller for a machine tool used for thread cutting. The present invention particularly relates to a controller for a machine tool capable of shredding chips occurring during thread cutting efficiently.

Related Art

Thread cutting has been performed in various methods. In many cases, a machine tool including multiple axes has been used for thread cutting by means of coordinated motion of the multiple axes, for example. Such thread cutting is realized by lathe-turning machining on a surface of a circular cylindrical work into a spiral pattern. This lathe-turning machining is repeated on the surface of the circular cylindrical work. By doing so, a thread groove 10 having a sufficient depth is finally formed as shown in FIG. 4 to finish machining of a screw 12 as a whole.

FIG. 5 shows how the lathe-turning machining is being performed. As indicated by P in FIG. 5, the thread groove 10 is cut into a work 14 by cutting with a cutting tool 16 several times along a predetermined path 10a (position of the thread groove 10) on the work 14. FIG. 5 shows a state immediately after the start of the cutting where the thread groove 10 is shallow. By repeating the cutting many times, the thread groove 10 is formed into a great depth (see FIG. 4) to finish formation of the screw 12 as a finished part. As shown in FIG. 5, the path 10a also exists on the back side of the work 14. The path 10a on the back side is indicated by dashed lines to facilitate understanding. In FIG. 5, for the nature of the path 10a, the path 10a is drawn as the same line as the thread groove 10 for the sake of convenience.

In FIG. 5, the work 14 is attached to a spindle axis 18 and rotates. The work 14 rotates in a manner indicated by a circular arrow C drawn as an arrow surrounding the spindle axis 18. A rotating coordinate axis indicated by the arrow C is called a C-axis. In other words, the C-axis corresponds to angular coordinates indicating an angle about the spindle axis.

The cutting tool 16 moves along the path 10a on the surface of the rotating work 14 for machining the thread groove 10 by cutting. To achieve this, the cutting tool 16 is required to move along a Z-axis (see FIG. 5), which is a coordinate axis extending in the lengthwise direction of the work 14, in synchronization with the rotation of the work 14 in the C-axis direction. An arrow Z indicates the direction of a Z coordinate axis (hereinafter called the Z-axis).

By such movement of the cutting tool 16 in the Z-axis direction, the thread groove 10 having a so-called spiral pattern is cut to form the screw 12. If the cutting tool 16 moves fast in the Z-axis direction, the thread groove 10 follows a steeper spiral pattern. If the cutting tool 16 moves slowly in the Z-axis direction, the thread groove 10 follows a gentler spiral pattern.

As described above, cutting is performed several times. At first, the thread groove 10 is formed into a shallow depth. After repeating the cutting many times, the thread groove 10 is formed into a greater depth. More specifically, the cutting tool 16 is controlled in such a manner that, as a result of each cutting, the cutting tool 16 gradually moves in the direction of an X coordinate axis (see FIG. 5) perpendicular to the surface of the work 14 for cutting of the work 14 at a gradually deepened position. An arrow X indicates the direction of the X coordinate axis (hereinafter called an X-axis). As a result of such control, formation of the screw 12 shown in FIG. 4 is finally finished.

In the foregoing thread cutting, chips are also required to be shredded properly. Various responsive techniques have been suggested. For example, patent document 1 discloses a technique relating to a device for thread cutting by means of infeed process performed several times. According to this technique, vibration is superimposed on the movement of a driving axis to determine different vibration phase shift amounts between the infeed processes. Patent document 1 states that this device allows fragmentation of chips with vibration by adjusting a vibration phase properly in each infeed process.

Patent document 2 discloses a device including means of causing reciprocating vibration in a radial direction of a work, and vibration setting means that sets a vibration pattern for each infeed process involving the reciprocating vibration in such a manner that a part already cut by different infeed process is partially present in a part to be machined by predetermined infeed process. Patent document 2 states that, with such oscillation in the radial direction, chips occurring during cutting are fragmented.

Patent Document 1: Japanese Patent No. 5851670 Patent Document *: PCT International Publication No. WO2016/056526

SUMMARY OF THE INVENTION

FIG. 6 shows thread cutting performed conventionally by applying oscillation in a radial direction. FIG. 6 is an enlarged view of an area A at a tip portion of the cutting tool 16 of FIG. 5. In FIG. 6, the C-axis is a coordinate axis extending in a direction substantially perpendicular to the drawing. The X-axis and the Z-axis extend in their directions similar to those of FIG. 5. As shown in FIG. 6, the cutting tool 16 makes reciprocating motion along the X-axis in response to a speed command for the X-axis. This motion is oscillation in the radial direction and direction 19 of this oscillation is shown in FIG. 6.

As described above, during thread cutting, the work 14 is cut with the cutting tool 16 many times to make a thread groove gradually deeper. For example, FIG. 6 shows a path 20 of the cutting tool 16 in machining by cutting along a first path. The cutting tool 16 used in this example has a tip shape such as a v-shaped blade, so that the cutting tool 16 follows the path 20 having a substantially right-angled cross section (see FIG. 6). As shown in FIG. 6, a subsequent path 22 on a second path is located at a greater depth in the X-axis direction. In this way, the machining by cutting proceeds more deeply for each path to form the thread groove 10.

The oscillation 19 in the X-axis direction is generated by infeed and cutting-out. The infeed means oscillation applied in a direction in which the cutting tool 16 gets closer to the work 14. The cutting-out means oscillation applied in a direction in which the cutting tool 16 gets away from the work 14. In particular, the thread groove 10 is cut into a predetermined depth by the infeed.

FIG. 7 shows a view taken from the direction of an arrow D of FIG. 6. The C-axis is a rotating coordinate axis, so that it should precisely be a coordinate axis extending in an arc-like pattern. Meanwhile, in a narrow range, such as that in FIG. 6, the C-axis can be approximated to substantially linear coordinates, as shown in FIG. 7. As shown in FIG. 7, according to the conventional technique, when the cutting tool 16 moves in a machining direction (C-axis direction), oscillating motion in the X-axis direction (radial direction of the work 14) is made, as described above. As the machining by cutting proceeds, a path of the cutting tool 16 moves to a deeper position of the work 14. This locates the path 22 on the second path at a deeper position than the path 20 on the first path. Here, being closer to the center of a spindle axis, which is the rotational center of the work 14, is expressed as "being deeper" on the X-axis. Being farther from the center of the work 14 and closer to the surface of the work 14 is expressed as "being shallower" on the X-axis. In this case, regarding the path 22 on the second path, an oscillation phase is set in such a manner that a part already cut by different infeed process (machining by cutting along the first path) is partially present in a part to be machined by infeed process along this path 22 (second path). As shown in FIG. 7, an idling J is generated in these parts to allow shredding of chips.

FIG. 8 shows a view taken from an arrow E of FIG. 7. Like in FIG. 7, the C-axis is approximated to substantially linear coordinates. In FIG. 8, the path 20 on the first path is expressed by two ridges separated by a blade width K1 of the cutting tool 16 and shows a so-called cut end. As has been described above, oscillation is applied in the X-axis direction, so that the path 20 has a vibrating shape, like in the case of FIG. 7, etc. The path 22 on the second path is expressed by two ridges separated by a blade width K2 of the cutting tool 16. The blade width K2 is larger than the blade width K1 because machining by cutting along the second path proceeds at a deeper position. Oscillation is also applied in the X-axis direction to the path 22 on the second path, so that the path 22 also has a vibrating shape, like in the case of FIG. 7, etc.

As described above, regarding the path 22 on the second path, an oscillation phase is set in such a manner that a part already cut by different infeed process (machining by cutting along the first path) is partially present in a part to be machined by infeed process along this path 22 (second path). This results in the generation of the idling J in these parts as shown in FIG. 8 to allow shredding of chips. FIG. 8 shows a machining path 24 followed by the cutting tool 16. As viewed from the surface of the work 14 (from the X-axis direction), a first path and a second path of the machining path 24 follow similar lines. This because a machining path on the first path and a machining path on the second path differ only in depth (position in the X-axis direction) and are similar in position on the Z-axis and in position on the C-axis.

However, according to the foregoing conventional technique of applying oscillation only in the radial direction to thread cutting, shredding of chips becomes difficult according to a machining method. The foregoing example described by referring to FIGS. 6 to 8 applies a thread cutting method by means of radial infeed (right angle infeed). Meanwhile, in a machining method by means of flank infeed (single edge infeed), for example, it becomes difficult in some cases to shred chips through application of oscillation only in the radial direction. The reason therefor will be described below by referring to FIGS. 9 to 11.

FIG. 9 shows an example as a substitute for FIG. 6 resulting from application of the motion in the radial infeed described in FIG. 6 to the flank infeed. The example of FIG. 9 differs from that of FIG. 6 in that the path 20 on the first path of the machining by cutting and the path 22 on the second path of the machining by cutting shown in FIG. 9 are shifted in position in the Z-axis direction. More specifically, according to the flank infeed, a machining path on a first path and a machining path on a second path differ not only in value in the X-axis direction (namely, depth) but also in value in the Z-axis direction. In this regard, according to the foregoing conventional technique, oscillation is applied only in the radial direction of the work 14 (namely, X-axis direction). FIG. 9 shows an oscillation direction 19 along the first path and an oscillation direction 19b along the second path. Each of these directions is oscillation in the X-axis direction. FIG. 10 shows a view taken from an arrow F of FIG. 9. FIG. 10 corresponds to FIG. 7 referred to above. In other words, FIG. 10 is a view resulting from application of the flank infeed to FIG. 7. FIG. 10 differs from FIG. 7 in that FIG. 10 includes a J1 where idling is absent instead of the idling J. While idling in the X-axis direction appears to occur in J1, shift between the machining path on the first path and the machining path on the second path in a direction orthogonal to the plane of the drawing (Z-axis direction) prevents generation of idling, resulting in a failure to shred chips.

FIG. 11 shows a view taken from an arrow G of FIG. 10. FIG. 11 is a view resulting from application of the flank infeed to FIG. 8 referred to above. Like in FIG. 8, the path 20 on the first path in FIG. 11 is expressed by two ridges separated by the blade width K1 of the cutting tool 16. As a result of application of oscillation in the X-axis direction, the cutting width of the path 20 on the first path is varied by a cutting depth. Thus, the path 20 on the first path also has a vibrating shape. The path 22 on the second path is expressed by two ridges separated by the blade width K2 of the cutting tool 16. Like the path 20 on the first path, the path 22 on the second path has a vibrating shape. The blade width K2 is larger than the blade width K1 because machining by cutting along the second path proceeds at a deeper position. As also shown in FIG. 11, according to the machining method using the flank infeed, the machining path on the first path and the machining path on the second path are shifted not only in the X-axis direction but also in the Z-axis direction. This makes an area where idling is to be generated in the case of the radial infeed become the area J1 where idling is absent. Hence, in some cases, it becomes impossible to shred chips.

The present invention has been made in view of the foregoing and is intended to provide a controller for a machine tool capable of shredding chips in any thread cutting method.

(1) The present invention provides a controller (controller 100 described later, for example) for a machine tool used for thread cutting by means of lathe-turning machining on a work (work 214 described later, for example), comprising: an oscillation condition calculation unit (oscillation condition calculation unit 102 described later, for example) that calculates an oscillation amplitude and an oscillation direction allowing shredding of chips occurring from the lathe-turning machining based on an infeed amount (infeed amount L1 described later, for example) in a radial direction of the work and a shift amount (shift amount L2 described later, for example) in a circumferential direction of the work relative to a last machining path of a tool (cutting tool 16, 216 described later, for example) used for the lathe-turning machining on the work; an oscillation command calculation unit (oscillation command calculation unit 104 described later, for example) that calculates an oscillation command for causing the work and the tool to oscillate relative to each other based on the oscillation amplitude and the oscillation direction calculated by the oscillation condition calculation unit; and an adder (second adder 110 described later, for example) that adds a movement command for moving the work and the tool relative to each other for the lathe-turning machining on the work and the oscillation command.

(2) The oscillation condition calculation unit may calculate the oscillation amplitude and the oscillation direction in such a manner that a part already machined by the lathe-turning machining along the last machining path is partially present in the lathe-turning machining that causes the work and the tool to oscillate relative to each other.

(3) The oscillation command calculation unit may not output the oscillation command for a final machining path.

The present invention can provide a controller for a machine tool capable of shredding chips in any thread cutting method.

DETAILED DESCRIPTION OF THE INVENTION

An embodiment of the present invention will be described below in detail based on the drawings.

Figure 1:
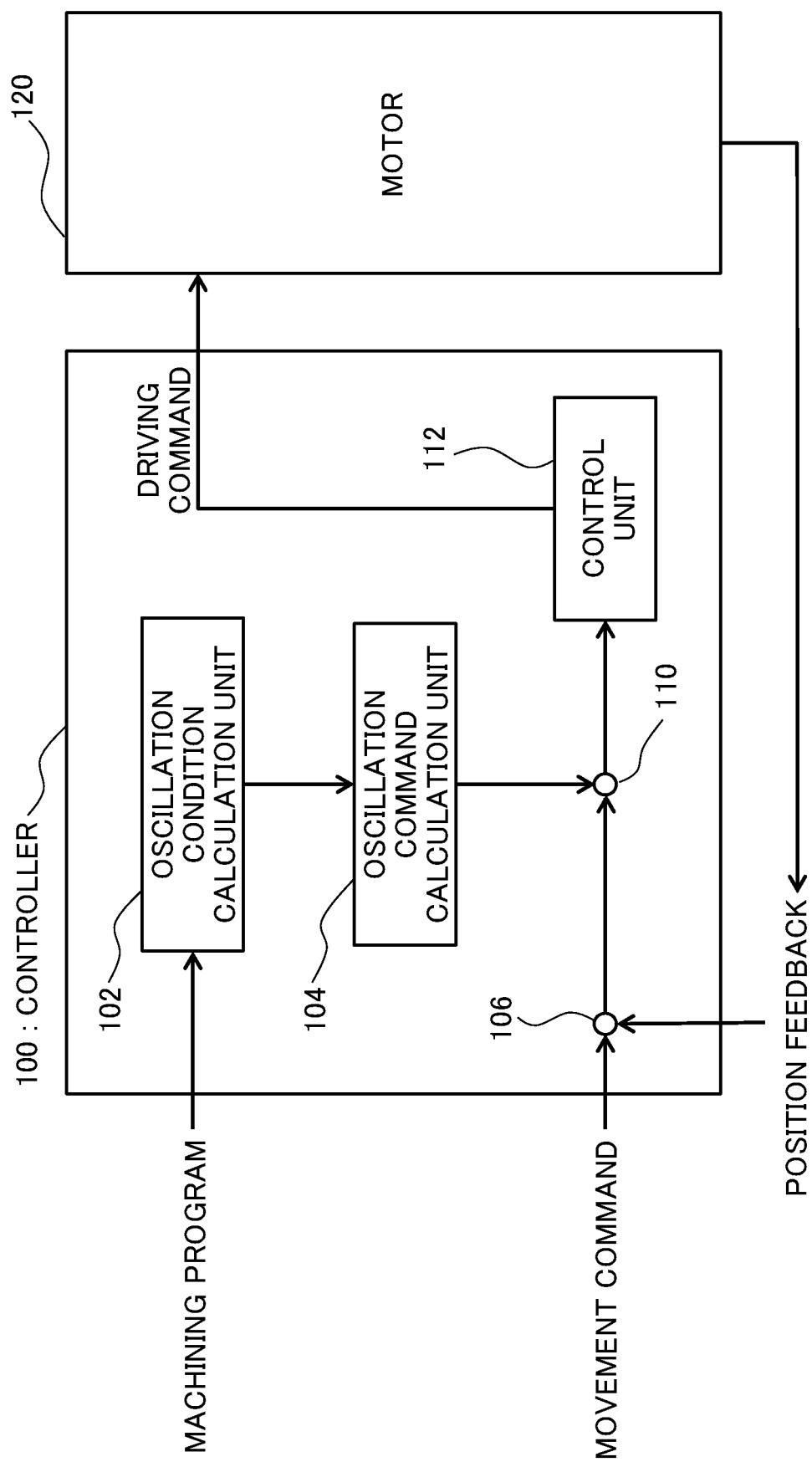
FIG. 1 is a configuration block diagram of a controller for a machine tool according to an embodiment.

FIG. 1 is a configuration block diagram of a controller 100 for a machine tool according to the embodiment. The controller 100 receives a movement command, etc. from various types of higher-order controllers and outputs a driving command for driving a motor 120 of the machine tool, thereby controlling the machine tool.

As shown in FIG. 1, the controller 100 includes an oscillation condition calculation unit 102, an oscillation command calculation unit 104, a first adder 106, a second adder 110, and a control unit 112. The controller 100 may be a so-called servo controller. These structures of the controller 100 may be configured using programs describing respective motions by these structures and a CPU to execute these programs. The controller 100 may be configured as a computer. A CPU in this computer may execute programs describing the respective functions of these structures of the controller 100 to realize the structures.

The oscillation condition calculation unit 102 receives a machining program from outside and calculates at least the amplitude of oscillation and the direction of the oscillation based on the machining program. In the embodiment, the oscillation condition calculation unit 102 compares a current machining path and a last machining path based on the content of the input machining program and determines an infeed amount in a radial direction of a work (X-axis direction) relative to the last machining path and a shift amount in a circumferential direction of the work (Z-axis direction) relative to the last machining path. Based on the determined infeed amount and shift amount, the oscillation condition calculation unit 102 calculates the amplitude of oscillation and the direction of the oscillation so as to allow shredding of chips during lathe-turning machining.

More specifically, based on the infeed amount in the radial direction of the work (X-axis direction) relative to the last machining path and the shift amount in the circumferential direction of the work (Z-axis direction) relative to the last machining path, the oscillation condition calculation unit 102 calculates an oscillation amplitude and an oscillation direction so as to incorporate a part partially already machined by lathe-turning machining along the last machining path.

In the embodiment, as a result of the provision of the foregoing oscillation condition calculation unit 102, machining paths are compared to calculate the amplitude of oscillation and the direction of the oscillation. This makes it possible to shred chips caused by lathe-turning machining reliably. As a result, it becomes possible to apply oscillation responsive to various types of machining methods flexibly compared to the conventional technique by which oscillation is controlled simply only in the X-axis direction (a radial direction of a work).

The machining program is a program describing motion in lathe-turning machining on a work 214. Thus, inspecting the machining program makes it possible to see the relative positions of machining paths during machining by cutting. This allows the oscillation condition calculation unit 102 to compare the current machining path and the last machining path and see the infeed amount in the radial direction of the work (X-axis direction) and the shift amount in the circumferential direction of the work (Z-axis direction), as described above. The machining program may be supplied to the oscillation condition calculation unit 102 using various interfaces. In the illustration of FIG. 1, the machining program is supplied from the outside of the controller 100. Alternatively, the machining program may be stored in the controller 100.

The oscillation condition calculation unit 102 can be configured using a program describing the foregoing motion, a CPU to execute the program, and an input interface for input of the machining program. As described above, if the machining program is stored in the controller 100, provision of this input interface is not always required.

The oscillation command calculation unit 104 calculates an oscillation command to be superimposed on a movement command for each axis for thread cutting of the work 214, for example. Based on the amplitude of oscillation and the direction of the oscillation calculated by the oscillation condition calculation unit 102, the oscillation command calculation unit 104 calculates an oscillation command for commanding this oscillation.

Regarding an oscillation frequency (or cycle), the oscillation command calculation unit 104 may calculate an oscillation command for this oscillation frequency input from the outside (not shown). Alternatively, this oscillation frequency may be stored in advance in the oscillation command calculation unit 104. For example, the oscillation frequency (or cycle) may be a product of the rotation number of a spindle axis multiplied by a constant. Oscillation may be applied in the form of a sine wave, for example. Meanwhile, for a cyclic signal, a triangular wave signal is applicable, for example. These oscillation conditions may be input through a predetermined input interface. For example, an operator may input the oscillation conditions through a keyboard or a mouse. Alternatively, the oscillation conditions may be input from a different computer through a predetermined communication interface.

The oscillation command calculation unit 104 can also be configured using a program describing the motion by the oscillation command calculation unit 104 and a CPU to execute the program. The oscillation command calculation unit 104 may include a predetermined interface for input of an oscillation condition.

The first adder 106 receives the movement command supplied from the foregoing higher-order controller. This movement command is a movement command distributed to the device (controller 100) to which the first adder 106 belongs. The first adder 106 subtracts a position feedback value transmitted from the motor 120 of the machine tool from this movement command and outputs a movement signal resulting from the subtraction. By doing so, it becomes possible to perform a so-called feedback control. The first adder 106 can also be configured using a program describing the motion by the first adder 106 and a CPU to execute the program.

The second adder 110 adds a result of the calculation by the first adder 106 and the oscillation command and outputs a final movement signal. By doing so, oscillation can be applied to the movement command. The second adder 110 can also be configured using a program describing the motion by the second adder 110, and a CPU to execute the program.

The control unit 112 receives the movement command including the oscillation command added by the second adder 110. Then, the control unit 112 calculates a driving command for driving the motor 120 in response to a position and deviation in the movement command resulting from the addition. The control unit 112 can also be configured using a program describing the motion by the control unit 112 and a CPU to execute the program. This driving command is supplied to the motor 120 of the machine tool and is a command output to the motor 120 for driving each axis of the machine tool.

One of the characteristics of the controller 100 of the embodiment is that, in order to shred chips occurring during thread cutting, the work 214 and a cutting tool 216 are caused to oscillate relative to each other according to a thread cutting method. This relative oscillation may be a movement of the cutting tool 216 while the work 214 stops, or may be a movement of the work 214 while the cutting tool 216 stops. Alternatively, the work 214 and the cutting tool 216 may move simultaneously. In a case mainly described in the following, oscillation is applied to the cutting tool 216. Alternatively, the work 214 may be configured to oscillate. According to the conventional technique, oscillation is applied only in the radial direction of the work 214. By contrast, in the embodiment, the amplitude and the direction of oscillation are controlled in response to a machining direction to allow more reliable shredding of chips.

Figure 2:
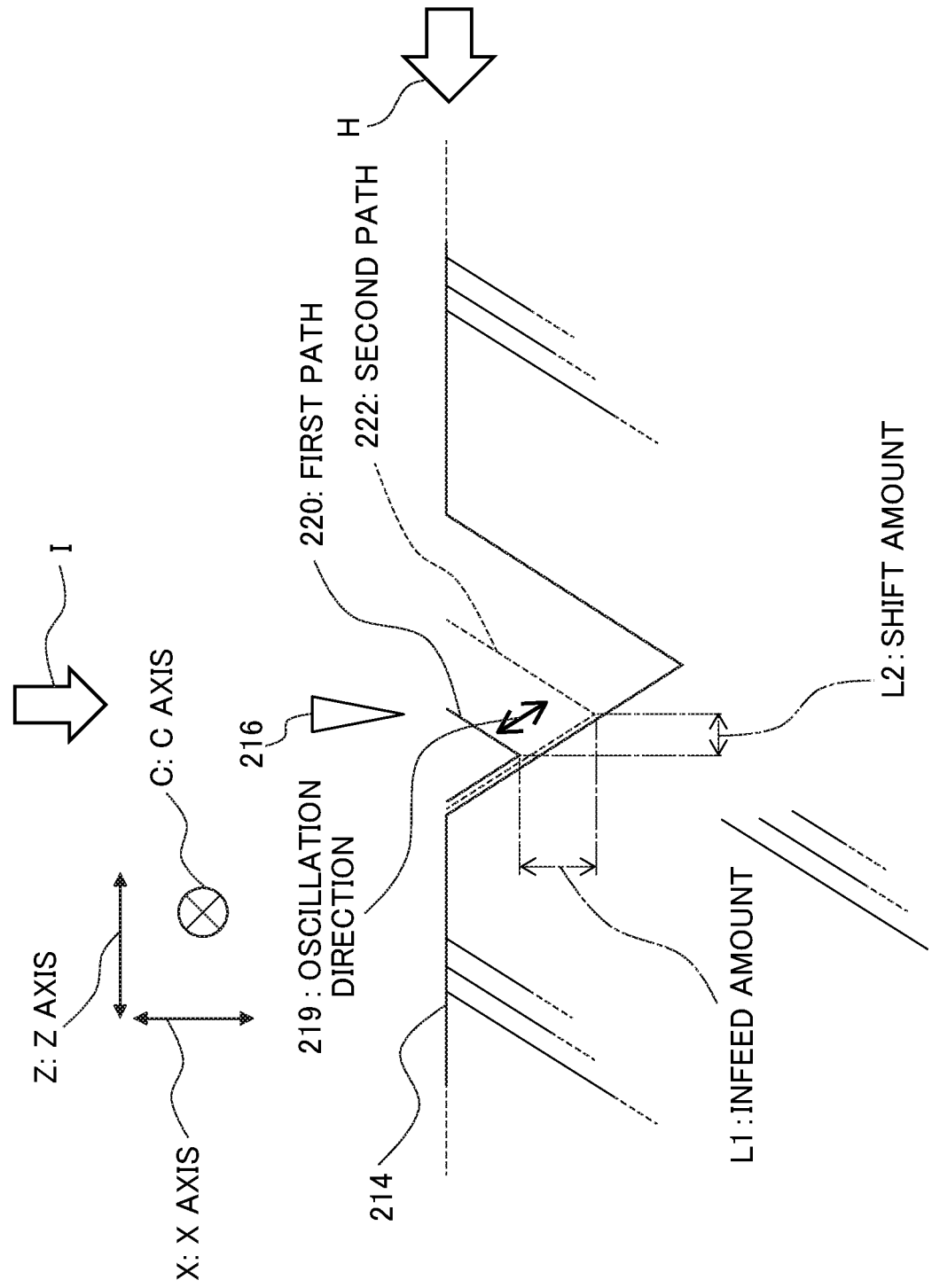
FIG. 2 is an explanatory view showing an example of motion using a machining method (flank infeed) other than radial infeed according to the embodiment.
Figure 5:
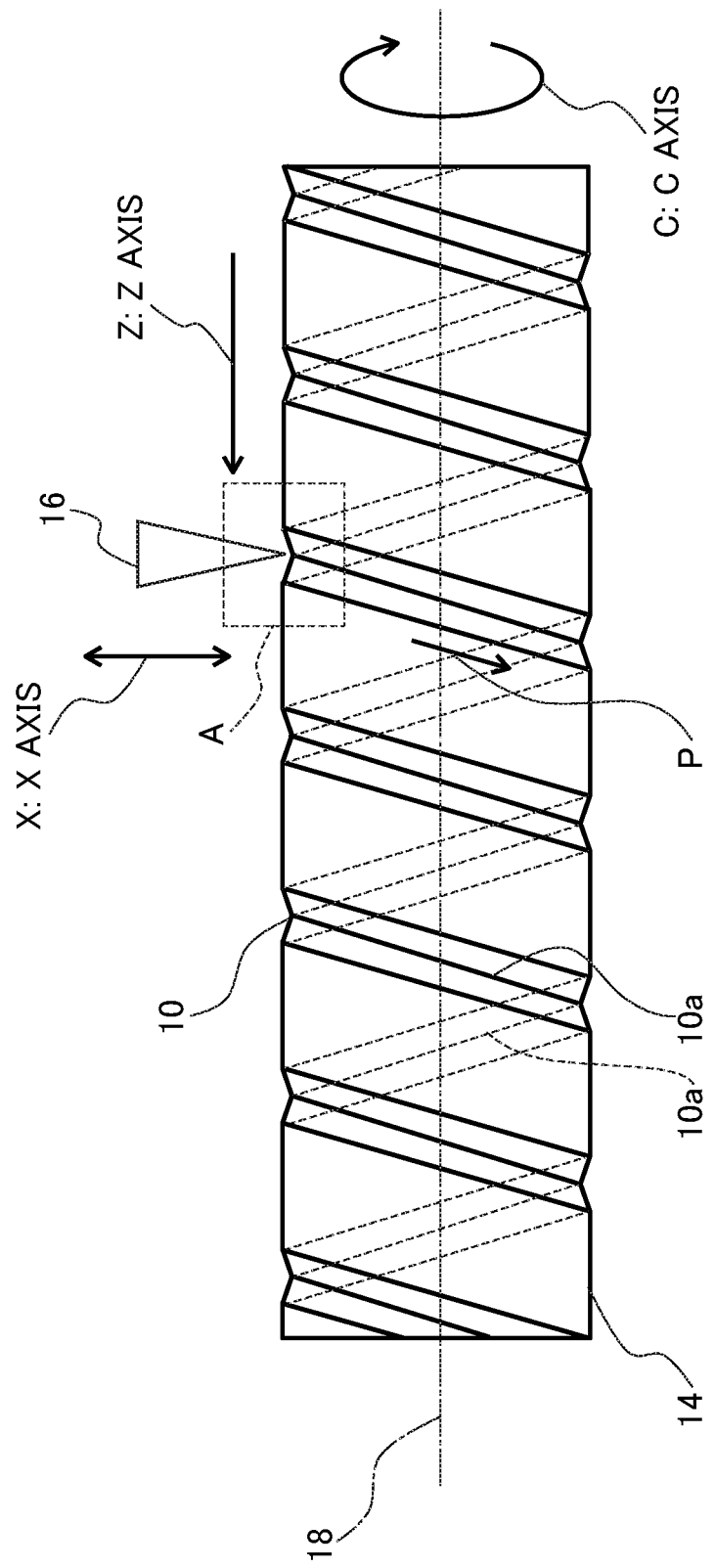
FIG. 5 is an explanatory view showing how thread cutting is being performed for forming the screw.
Figure 6:
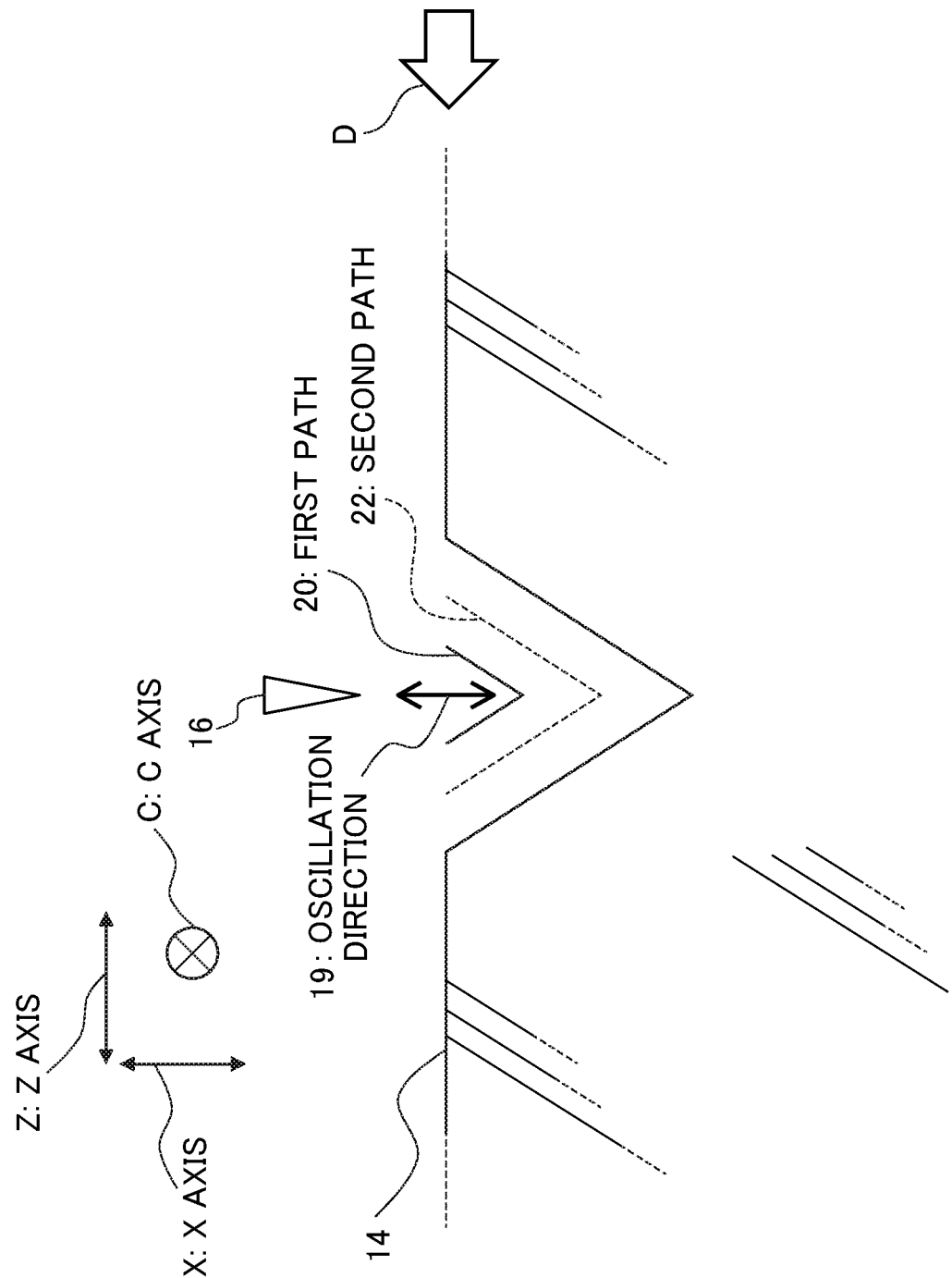
FIG. 6 is an enlarged view of an area A of FIG. 5 and is an explanatory view showing thread cutting involving oscillation in an X-axis direction, namely, relative oscillation between a work and a cutting tool and oscillation in a radial direction of the work.
Figure 9:
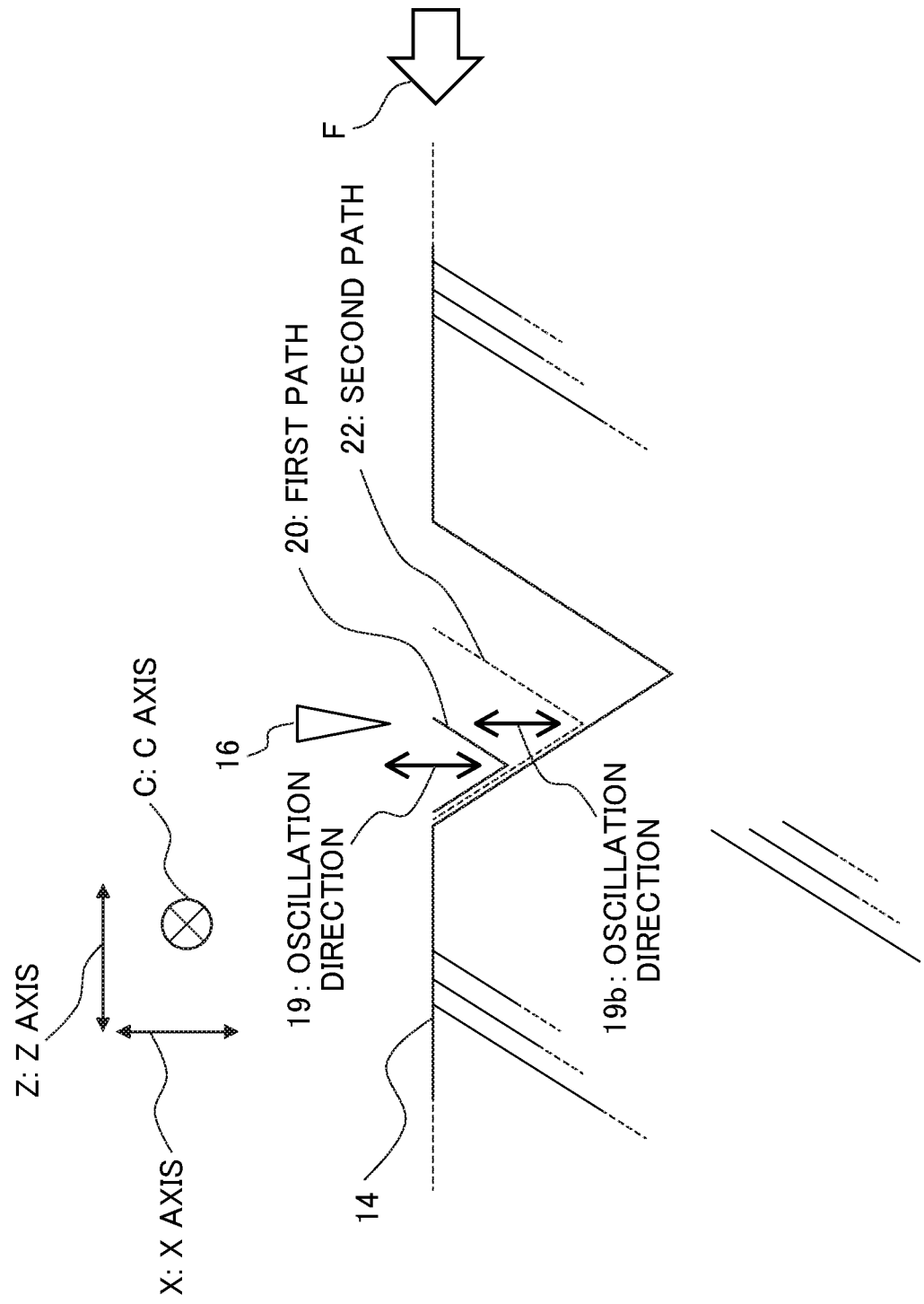
FIG. 9 is an enlarged view of the area A of FIG. 5 and is an explanatory view showing motion in thread cutting involving oscillation in the radial direction of the work to which flank infeed is applied.
Figure 10:
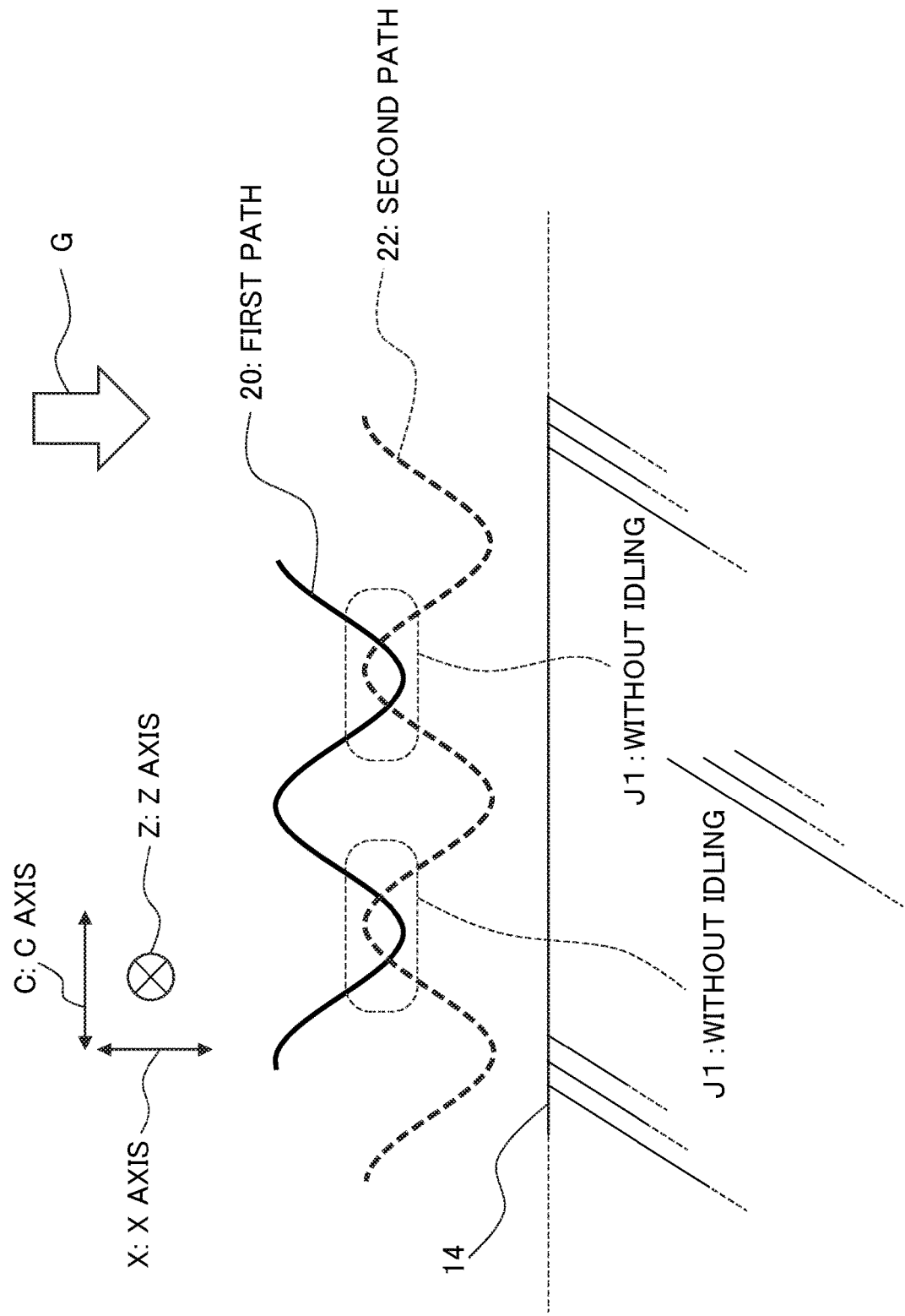
FIG. 10 is an explanatory view showing motion in thread cutting taken from an arrow F of FIG. 9 involving oscillation in the radial direction of the work to which the flank infeed is applied.

FIG. 2 shows how thread cutting of the embodiment proceeds. FIG. 2 is a view of the work 214 taken from the same direction as the direction of FIG. 9 showing the conventional technique. Like FIG. 9, FIG. 2 is an enlarged view of an area A of FIG. 5. Like in FIG. 9, flank infeed is applied as a machining method in FIG. 2.

In this machining method (flank infeed), after implementation of machining by cutting along a first path, the cutting tool 216 as a v-shaped blade moves so as to make sliding motion of one surface of a tool nose of the cutting tool 216 (the work 214 is not cut with the moving cutting tool 216). More specifically, the cutting tool 216 is brought to a deeper position while being shifted in the Z-axis direction. After the cutting tool 216 is located at the deeper position, the cutting tool 216 is used for machining by cutting along a second path (see FIG. 2).

The embodiment is characterized in that the amplitude of oscillation and the direction of the oscillation are determined based on a tool path 220 on a first path and a tool path 222 on the second path. According to the conventional technique (see FIG. 9), oscillation is always applied only in the X-axis direction (the radial direction of the work 214) in any machining method. By contrast, in the embodiment, the amplitude of oscillation and the direction of the oscillation are determined based on the tool path 220 on the first path and the tool path 222 on the second path. This allows the machine tool to perform oscillating cutting under conditions in terms of an oscillation direction and an oscillation amplitude allowing reliable shredding of chips in response to an applied machining method.

According to the example shown in FIG. 2, for example, comparison between the tool path 220 on the first path and the tool path 222 on the second path shows that the tool path 222 on the second path is for cutting at a position deeper by an infeed amount L1 in the X-axis direction (radial direction) and shifted by a shift amount L2 in the Z-axis direction (circumferential direction). The shift amount L2 is expressed as a vector and takes a positive value and may also take a negative value. Thus, by use of the shift amount L2, it becomes possible to determine whether oscillation is to be applied in a positive Z-axis direction or a negative Z-axis direction.

In this regard, the oscillation condition calculation unit 102 of the embodiment calculates the amplitude of oscillation and the direction of the oscillation based on the foregoing infeed amount L1 and shift amount L2. For example, a distance between the tool path 220 on the first path and the tool path 222 on the second path is determined based on the infeed amount L1 and the shift amount L2. Thus, the amplitude of the oscillation can be calculated so as to be proportional to the determined distance. Further, the direction of the tool path 222 on the second path viewed from the tool path 220 on the first path is determined based on the infeed amount L1 and the shift amount L2. Thus, the direction of the oscillation can be calculated so as to match the determined direction. The oscillation condition calculation unit 102 can calculate the amplitude of oscillation and the direction of the oscillation to be applied in machining by cutting along the second path by following these processes, for example. As a result, as indicated by an oscillation direction 219 in FIG. 2, the amplitude of oscillation and the direction of the oscillation can be calculated so as to apply oscillation also in the Z-axis direction.

Figure 3:
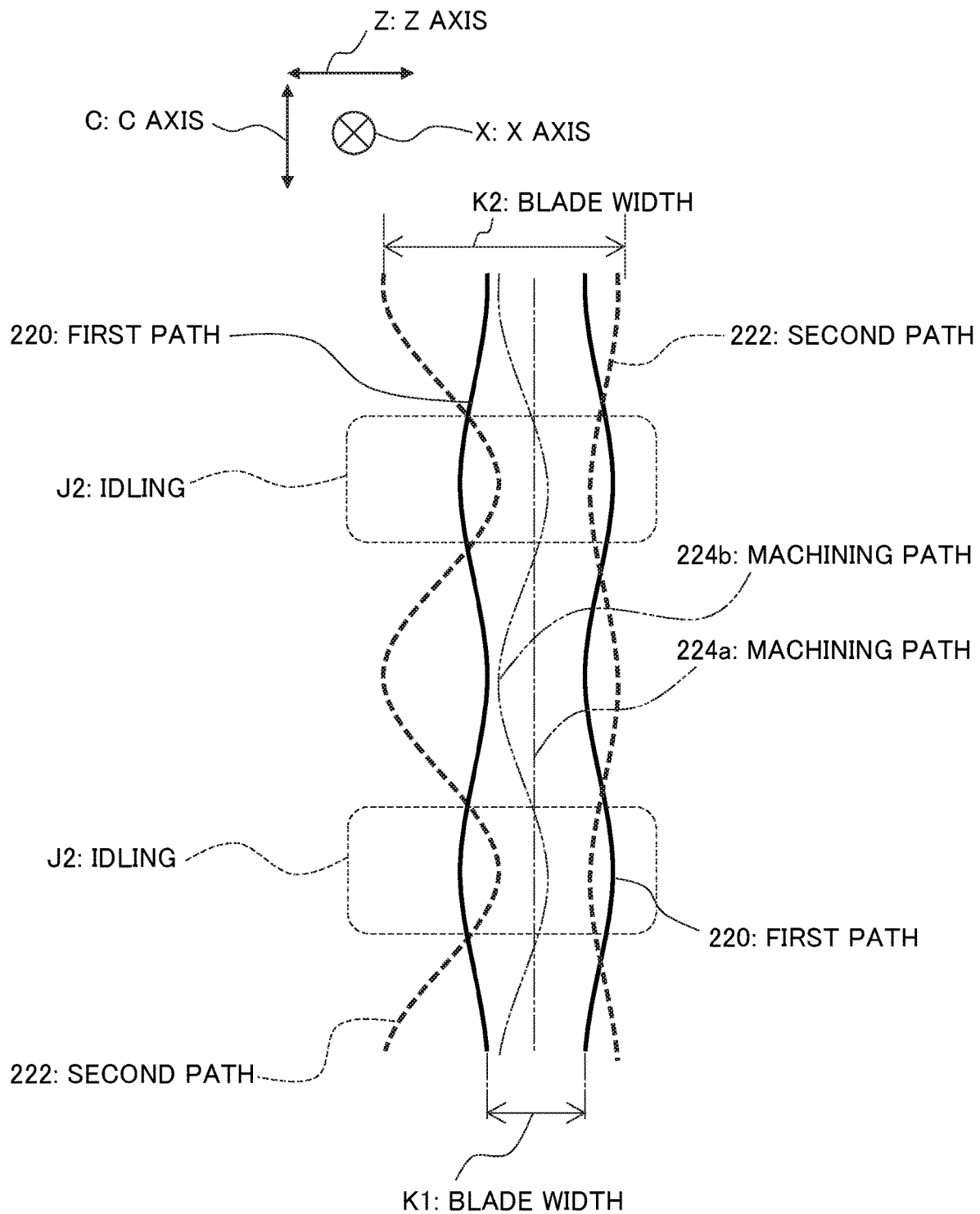
FIG. 3 is a different explanatory view showing an example of motion using the machining method (flank infeed) other than the radial infeed according to the embodiment.
Figure 4:
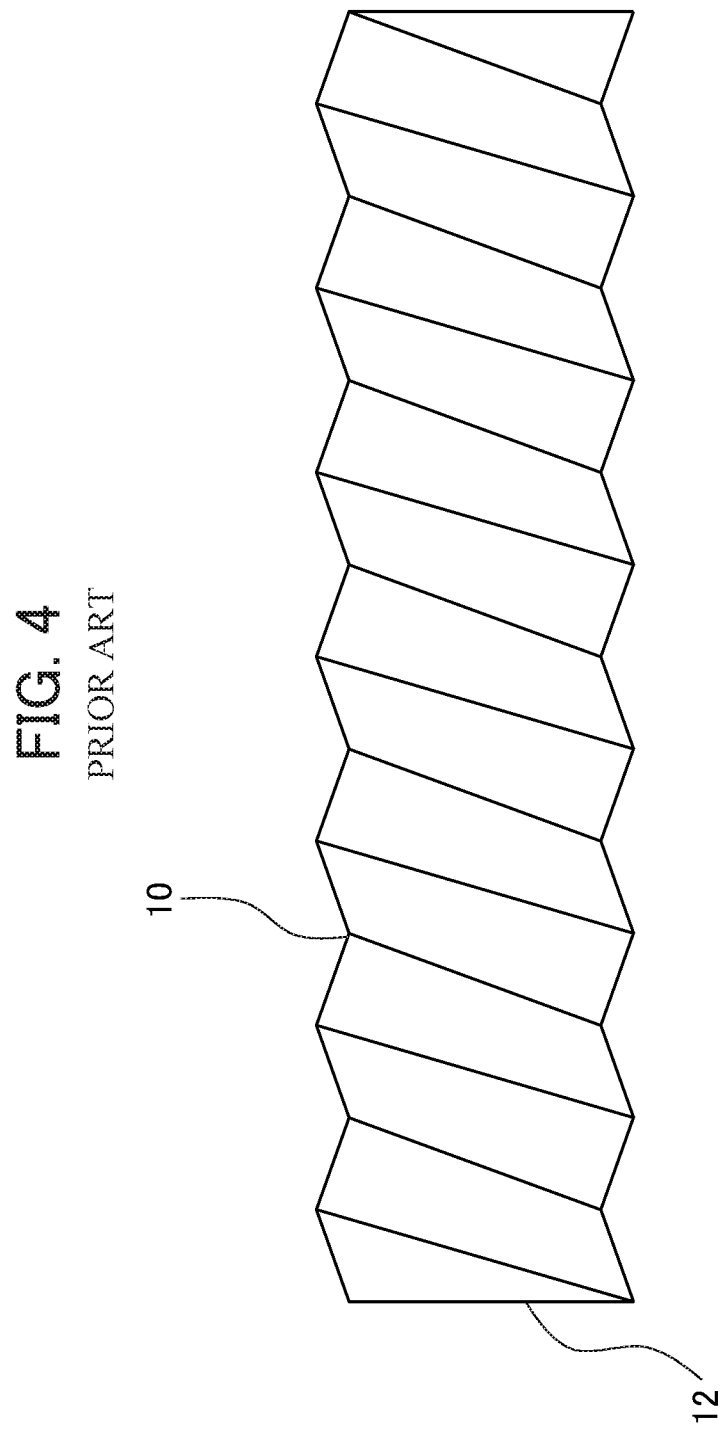
FIG. 4 shows the appearance of a screw formed by thread cutting.
Figure 7:
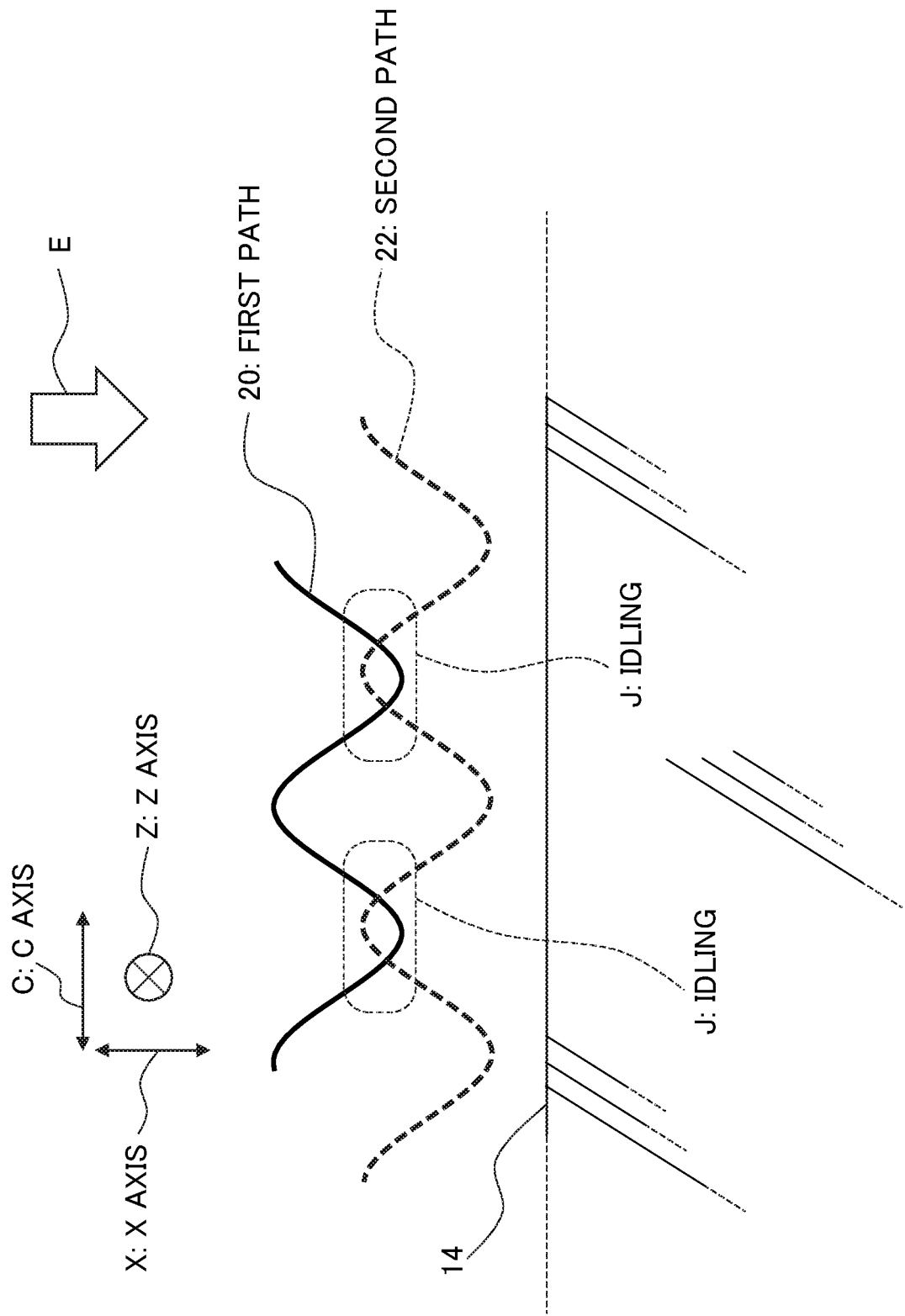
FIG. 7 is a view taken from an arrow D of FIG. 6 and is an explanatory view showing thread cutting involving oscillation in the radial direction of the work.
Figure 8:
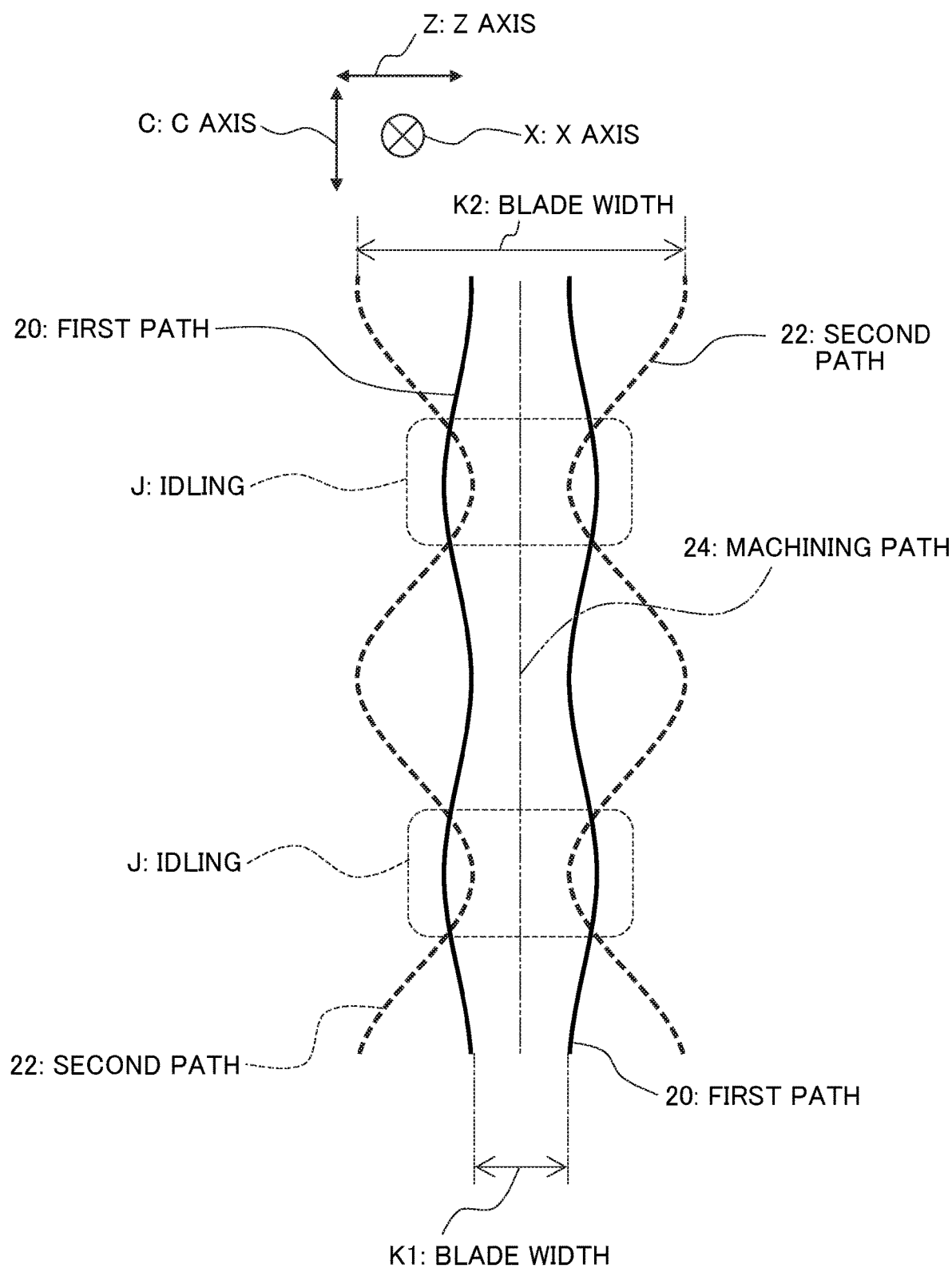
FIG. 8 is a view taken from an arrow E of FIG. 7 and is an explanatory view showing thread cutting involving oscillation in the radial direction of the work.
Figure 11:
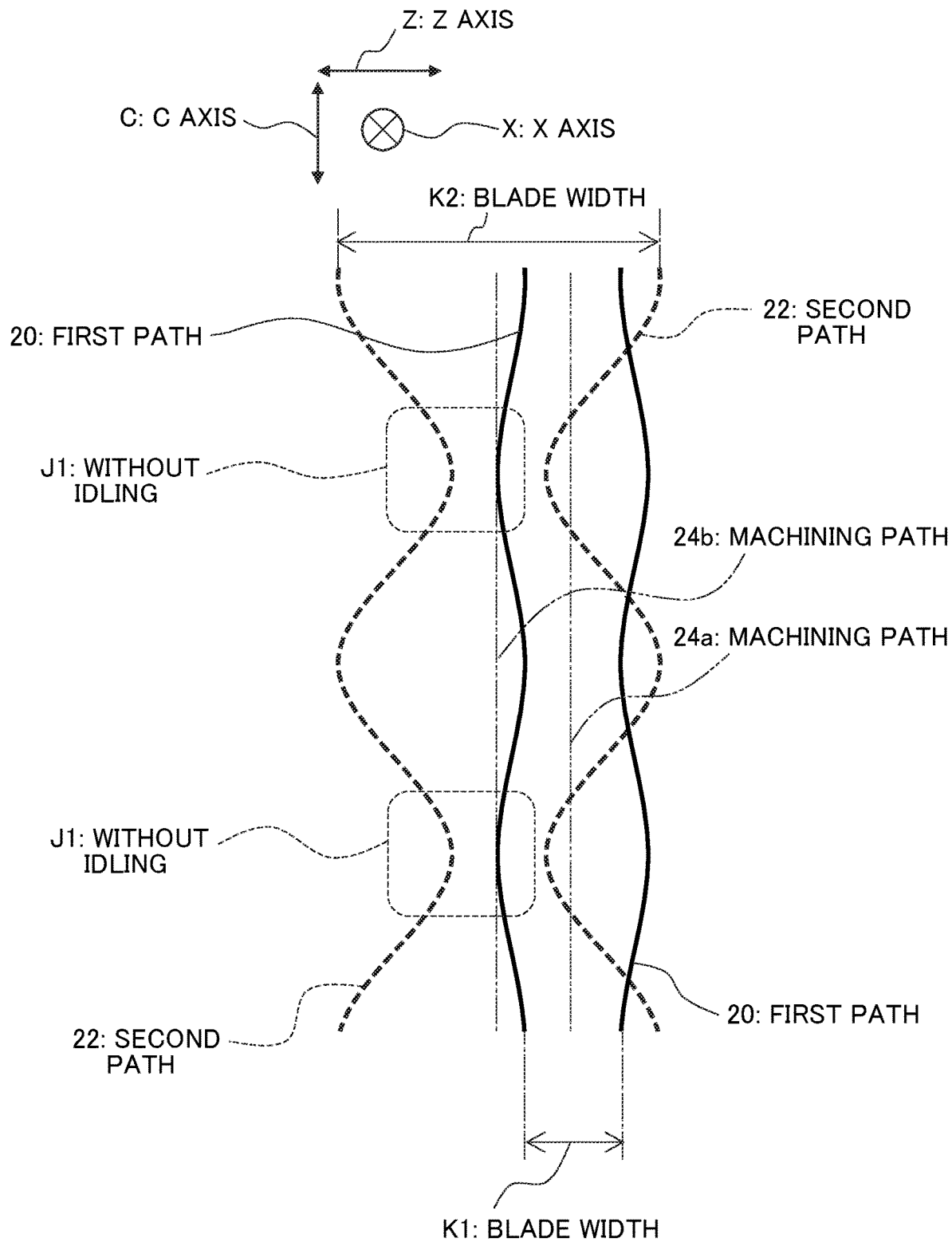
FIG. 11 is a view taken from an arrow G of FIG. 10 and is an explanatory view showing motion in thread cutting involving oscillation in the radial direction of the work to which the flank infeed is applied.

A view taken from an arrow H of FIG. 2 is similar to FIG. 7 showing the conventional technique. FIG. 3 shows a view taken from an arrow I of FIG. 2. Like FIG. 11, FIG. 3 shows an example resulting from application of the flank infeed. However, FIG. 3 differs from FIG. 11 in that diagonal oscillation, such as that shown in FIG. 2, is applied to the machining by cutting along the second path.

In FIG. 3, the tool path 220 on the first path is similar to the tool path 20 on the first path in FIG. 11. A machining path 224a on the first path in FIG. 3 is also similar to a machining path 24a in FIG. 11. However, unlike the tool path 22 on the second path in FIG. 11, the tool path 222 on the second path in FIG. 3 gets closer to the tool path 220 on the first path. This is because, in this example, the oscillation in the diagonal direction is applied to the tool path 222 on the second path, as shown in FIG. 2. As a result, as shown in FIG. 3, idling is generated in an area J2 to allow shredding of chips. In the embodiment, infeed may proceed while chips are shredded in this way, and then thread cutting may be performed. As described above, as a result of application of the diagonal oscillation, a machining path 224b on the second path becomes a vibrating path, unlike a machining path 24b in FIG. 11. Meanwhile, the machining path 224b is illustrated in an exaggerated fashion in the drawing for the convenience of illustration and is actually a substantially straight line.

According to the embodiment, the oscillation condition calculation unit 102 determines an infeed amount in the X-axis direction and a shift amount along the Z-axis relative to a last machining path (a tool path on a first path) based on the last machining path and a current machining path (a tool path on a second path). Based on the determined infeed amount and shift amount, the oscillation condition calculation unit 102 calculates the amplitude of oscillation and the direction of the oscillation. Thus, even if various types of machining methods are to be applied, an area of idling can be provided reliably on a machining path to allow reliable shredding of chips. In other words, the controller 100 capable of shredding chips in any thread cutting method can be realized. As a result, according to the embodiment, it becomes possible to shred chips in any of thread cutting methods including radial infeed (right angle infeed), flank infeed (single edge infeed), alternate infeed (staggered infeed), etc.

While the embodiment of the present invention has been described in detail above, the foregoing embodiment merely shows specific examples in implementing the present invention. The technical scope of the present invention is not be limited to the foregoing embodiment. Various changes are applicable to the present invention within a range not deviating from the substance of the invention. All these changes are also included in the technical scope of the present invention.

In the example described in the foregoing embodiment, an oscillation command is applied to a movement command for the cutting tool 216. However, the embodiment also includes a case where an oscillation command is applied to the work 214. An oscillation command may also be applied to a different axis. In the example described in the foregoing embodiment, a v-shaped blade is used as the cutting tool 216. However, a cutting tool of a different shape is also applicable.

In the example described in the foregoing embodiment, machining by cutting involves oscillation to be applied for thread cutting. However, machining by cutting not involving oscillation may be performed as final process. Finishing process may be performed without involving oscillation to increase machining accuracy. This may be achieved by configuring the oscillation command calculation unit 104 in such a manner that the oscillation command calculation unit 104 does not output an oscillation command for the final machining by cutting process. Alternatively, the oscillation command calculation unit 104 may be configured to output an oscillation command having a value 0 for the final machining by cutting process. Here, having a value 0 means not causing oscillation.

EXPLANATION OF REFERENCE NUMERALS 10, 10a Thread groove
12 Screw
14, 214 Work
16, 216 Cutting tool
18 Spindle axis
19 Oscillation direction
20, 220 Tool path on first path
22, 222 Tool path on second path
100 Controller
102 Oscillation condition calculation unit
104 Oscillation command calculation unit
106 First adder
110 Second adder
112 Control unit
120 Motor
224a Machining path on first path
224b Machining path on second path
C C-axis
J, J2 idling
J1 Area where idling cannot be generated
K1, K2 Blade width
L1 Infeed amount
L2 Shift amount
X X-axis
Z Z-axis

What is claimed is:

1. A controller for a machine tool used for thread cutting by means of lathe-turning machining on a work, comprising:
   a processor configured
   to calculate an oscillation amplitude and an oscillation direction allowing shredding of chips occurring from the lathe-turning machining based on an infeed amount in a radial direction of the work and a shift amount in a circumferential direction of the work relative to a last machining path of a tool used for the lathe-turning machining on the work;
   to calculate an oscillation command for causing the work and the tool to oscillate relative to each other based on the oscillation amplitude and the oscillation direction calculated by the oscillation condition calculation unit; and
   to add a movement command for moving the work and the tool relative to each other for the lathe-turning machining on the work and the oscillation command.

2. The controller for the machine tool according to claim 1, wherein the processor calculates the oscillation amplitude and the oscillation direction in such a manner that a part already machined by the lathe-turning machining along the last machining path is partially present in the lathe-turning machining that causes the work and the tool to oscillate relative to each other.

3. The controller for the machine tool according to claim 1, wherein the processor does not output the oscillation command for a final machining path.

* * * * *